(12) United States Patent
Stewart et al.

(10) Patent No.: US 10,719,059 B2
(45) Date of Patent: Jul. 21, 2020

(54) SYSTEMS AND METHODS FOR CONTROL OF OUTPUT FROM LIGHT OUTPUT APPARATUS

(71) Applicant: LENOVO (SINGAPORE) PTE. LTD., New Tech Park (SG)

(72) Inventors: Aaron Michael Stewart, Raleigh, NC (US); John Carl Mese, Cary, NC (US); Russell Speight Vanblon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 120 days.

(21) Appl. No.: 15/084,750

(22) Filed: Mar. 30, 2016

(65) Prior Publication Data

US 2017/0285594 A1    Oct. 5, 2017

(51) Int. Cl.

| *G05B 19/05* | (2006.01) |
| *G05B 19/042* | (2006.01) |
| *G05B 13/02* | (2006.01) |
| *G05F 1/66* | (2006.01) |
| *H05B 33/00* | (2006.01) |

(52) U.S. Cl.
CPC ........... *G05B 19/05* (2013.01); *G05B 13/024* (2013.01); *G05B 19/042* (2013.01); *G05F 1/66* (2013.01); *G05B 2219/23154* (2013.01); *G08C 2201/30* (2013.01); *H05B 33/00* (2013.01); *Y02B 20/46* (2013.01)

(58) Field of Classification Search
CPC .. G05B 19/042; G05B 13/024; H05B 33/086; H05B 33/0863; H05B 37/0218; H05B 37/0227; H05B 37/0236; H05B 37/0281; H05B 37/029; H05B 33/00; H05B 33/0851; H05B 33/0854; H05B 33/0872; G06F 1/1694; G08C 2201/30; G08C 2201/93; Y02B 20/46; G05F 1/66
USPC ........................................................ 700/110
See application file for complete search history.

(56) References Cited

U.S. PATENT DOCUMENTS

| 8,243,089 | B2* | 8/2012 | Marks ....................... G06F 3/14 345/426 |
| 8,447,031 | B2* | 5/2013 | Usher ...................... H04M 1/22 379/430 |
| 9,137,878 | B2* | 9/2015 | Thompson ......... H05B 37/0227 |
| 9,313,860 | B2* | 4/2016 | Wingren ............ H05B 37/0218 |
| 9,326,359 | B2* | 4/2016 | Bosua ............... H05B 33/0863 |
| 9,497,831 | B2* | 11/2016 | Hatta ................. H05B 37/0227 |
| 9,622,330 | B2* | 4/2017 | Lashina ............. H05B 33/0851 |
| 9,706,623 | B2* | 7/2017 | Rains, Jr. ........... H05B 37/0245 |

(Continued)

FOREIGN PATENT DOCUMENTS

| JP | 2007044201 A | * | 2/2007 | |
| WO | WO-2007130641 A3 | * | 4/2008 | .......... H04N 5/2226 |

*Primary Examiner* — Crystal J Barnes-Bullock
(74) *Attorney, Agent, or Firm* — John M. Rogitz; John L. Rogitz

(57) ABSTRACT

In one aspect, a device includes a processor, a communication interface accessible to the processor, and storage accessible to the processor. The storage bears instructions executable by the processor to identify an activity associated with a user. The instructions are also executable by the processor to use the communication interface to transmit at least one command to a light output apparatus to adjust light from the light output apparatus based on the identified activity.

20 Claims, 6 Drawing Sheets

(56) References Cited

U.S. PATENT DOCUMENTS

| | | | | |
|---|---|---|---|---|
| 9,743,491 B2* | 8/2017 | Loeb | | H05B 37/0227 |
| 9,775,218 B2* | 9/2017 | Loveland | | G05B 15/02 |
| 9,795,004 B2* | 10/2017 | Blum | | H05B 37/0227 |
| 9,807,851 B2* | 10/2017 | Child | | H05B 47/19 |
| 9,814,117 B2* | 11/2017 | Loveland | | H05B 37/0245 |
| 10,015,864 B2* | 7/2018 | Nolan | | H05B 37/0227 |
| 10,125,961 B2* | 11/2018 | Slosberg | | F21V 3/02 |
| 10,143,068 B2* | 11/2018 | Karc | | H05B 37/0272 |
| 10,164,789 B2* | 12/2018 | Vijayrao | | H04L 12/2809 |
| 10,478,359 B2* | 11/2019 | Kostic | | A61B 5/1121 |
| 2008/0004951 A1* | 1/2008 | Huang | | G06Q 30/02 |
| | | | | 705/14.67 |
| 2009/0134819 A1* | 5/2009 | Noguchi | | A61B 5/1118 |
| | | | | 315/308 |
| 2012/0057755 A1* | 3/2012 | Berkvens | | H05B 37/0227 |
| | | | | 382/103 |
| 2014/0285113 A1* | 9/2014 | Huang | | H05B 37/0272 |
| | | | | 315/297 |
| 2014/0375222 A1* | 12/2014 | Rains, Jr. | | H05B 37/0245 |
| | | | | 315/158 |
| 2015/0104772 A1* | 4/2015 | Goel | | G09B 5/02 |
| | | | | 434/238 |
| 2015/0130373 A1* | 5/2015 | Van De Sluis | | G08C 17/02 |
| | | | | 315/308 |
| 2015/0174361 A1* | 6/2015 | Baaijens | | A61N 5/0618 |
| | | | | 315/131 |
| 2015/0185713 A1* | 7/2015 | Glickfield | | H04W 4/005 |
| | | | | 700/44 |
| 2015/0296594 A1* | 10/2015 | Blum | | H05B 37/0227 |
| | | | | 315/158 |
| 2016/0081163 A1* | 3/2016 | Hatta | | H05B 37/0227 |
| | | | | 315/312 |
| 2016/0360594 A1* | 12/2016 | Chemel | | H05B 37/0227 |
| 2016/0381763 A1* | 12/2016 | Loeb | | H05B 37/0227 |
| | | | | 315/297 |
| 2017/0003666 A1* | 1/2017 | Nunn | | G08C 17/02 |
| 2017/0128296 A1* | 5/2017 | Kostic | | A61G 7/0527 |
| 2017/0265277 A1* | 9/2017 | Nolan | | H05B 37/0227 |
| 2018/0345078 A1* | 12/2018 | Blahnik | | A63B 24/0062 |

* cited by examiner

| User | Activity | Mood/Emotion | Time of Day | On/Off | Brightness | Color |
|---|---|---|---|---|---|---|
| User 1 | Reading | Content | Anytime | On | 5 | Yellow |
| User 2 | Watching T.V. | Happy | 7 – 10 p.m. | On | 2 | Yellow |
| User 2 | Playing game | Excited | 5 – 7 p.m. | Off | N/A | N/A |
| User 2 | Cooking | Hungry | 6 – 8 p.m. | On | 5 | White |
| Unknown Male | N/A | N/A | N/A | On | 4 | White |
| Unknown Female | N/A | N/A | N/A | On | 3 | Yellow |

SYSTEMS AND METHODS FOR CONTROL OF OUTPUT FROM LIGHT OUTPUT APPARATUS

FIELD

The present application relates generally to systems and methods for control of output from a light output apparatus.

BACKGROUND

As recognized herein, a first person in a room may have a first lighting preference while a second person m the room may have a second lighting preference. As also recognized herein, current lighting control systems do not adequately address the lighting preferences of both the first person, and the second person and may only attempt to comply with the lighting preference of one of the users. Furthermore, the present disclosure also recognizes that lighting preferences may vary based on activity, and that current lighting control systems give no regard to such.

SUMMARY

Accordingly, in one aspect a device includes a processor, a communication interface accessible to the processor, and storage accessible to the processor. The storage bears instructions executable by the processor to identify an activity associated with a user. The instructions are also executable to use the communication interface to transmit at least one command to a light output apparatus to adjust light, from the light output apparatus based on the identified activity.

In another aspect, a method includes identifying a first user and a second user at different locations within an area. The method also includes adjusting light output from a first light output apparatus based on at least a first lighting preference of the first user, and adjusting light output from a second light output apparatus based on at least a second lighting preference of the second user.

In still another aspect, a computer readable storage medium that is not a transitory signal comprises instructions executable by a processor to identify an activity associated with a user and to control a lighting apparatus to adjust light from the lighting apparatus based on the activity.

The details of present principles, both as to their structure and operation, can best be understood in reference to the accompanying drawings, in which like reference numerals refer to like parts, and in which:

DETAILED DESCRIPTION

Figure 1:
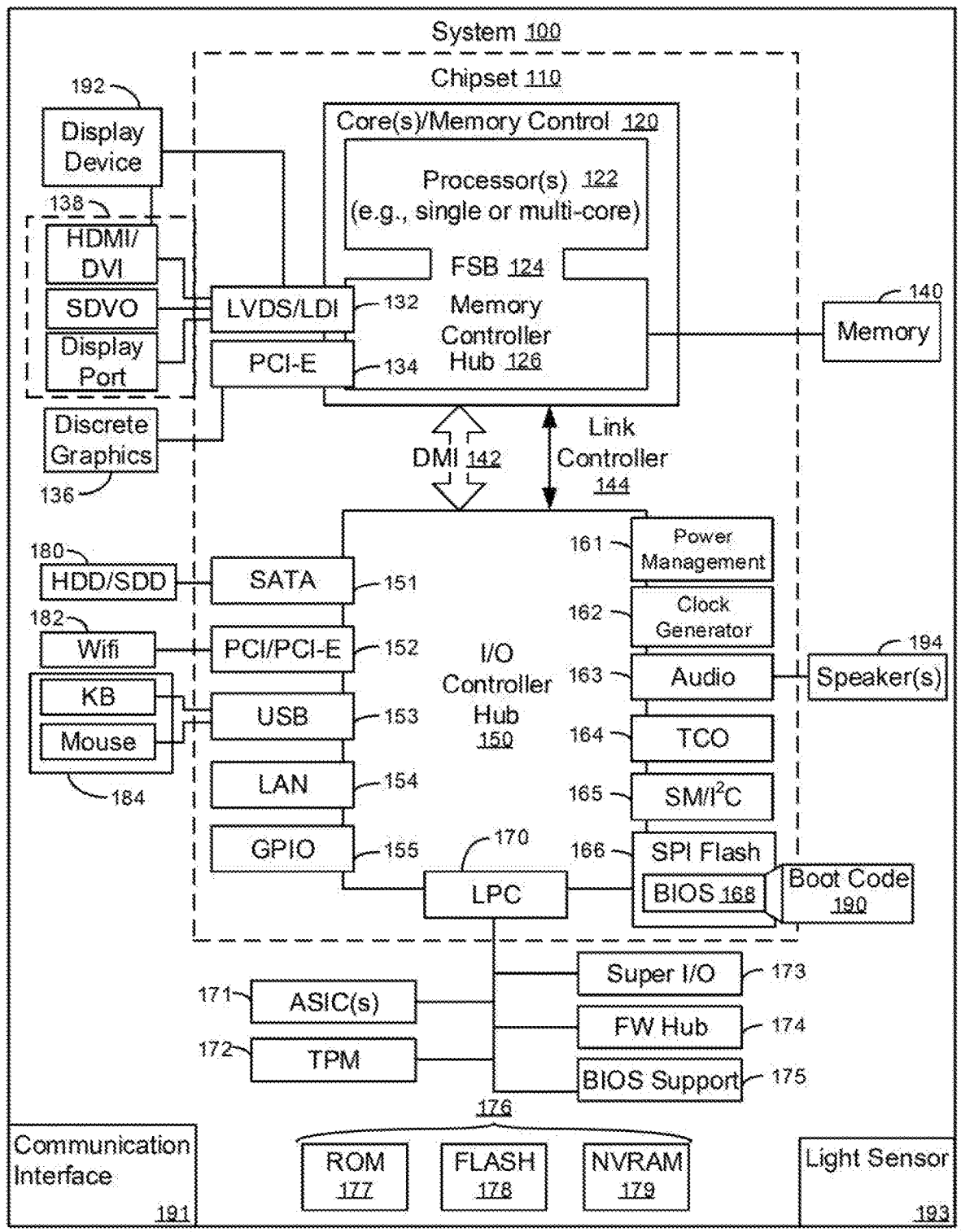
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical, blocks, modules, and circuits described herein, can be implemented or performed, in addition to a general purpose processor, in or by a digital signal processor (DSP), a field programmable gate array (FPGA) or other programmable logic device such as an application specific integrated circuit (ASIC), discrete-gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can fee written In an appropriate language such as but not limited to C # or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present, principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface. (DMI) 142 or a link controller 144. In the example of FIG. 1, the DMI 142 is a chip-to-chip interface, (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional, "northbridge" style architecture.

The memory controller hub 126 interfaces with memory 140. For example, the memory controller huh 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVPS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP), For example, the memory controller hub 126 may include a 16-lane (×16) PCI-E port for an external. PCI-E-based graphics card (including, e.g., one or more GPUs). An example system may include AGP or PCI-E for support of graphics.

In examples in which it is used, the I/O hub controller 150 can include a variety of interfaces. The example of FIG. 1 includes a SATA interface 151, one or more PCI-E interlaces 152 (optionally one or more legacy PCI interfaces), one or more USB interfaces 153, a LAN interface 154 (more generally a network, interface for communication over at least one network such as the Internet, a WAN, a LAN, etc. under direction of the processors) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCQ) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface post. Other network features may operate independent of a PCI-E interface.

The interfaces of the I/O hub controller 150 may provide for communication with, various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O huh controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LFC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

FIG. 1 also shows that the system 100 may include at least one additional communication interface such as a local area connection (LAN) interface 191. The LAN interface 191 may be a wired and/or wireless LAN interface, where examples of wireless LAN interfaces that may establish the LAN interface 191 include a Wi-Fi transceiver for communicating with other devices in accordance with present principles using Wi-Fi communication protocols, a Bluetooth and/or Bluetooth low energy (BLE) communication element (e.g., a Bluetooth 4.0 communication element) for communicating with other devices in accordance with present principles using Bluetooth communication protocols, and/or a near field communication (NFC) element for communicating using with other devices in accordance with present principles using NFC protocols. However, note that still other communication interfaces may be used for communication with other devices and apparatuses in accordance with present principles. For instance, micro-USB 3.0 communication interfaces may be used.

Still further, the system 100 may include at least one light sensor 193. The light sensor 193 may sense light at a location of the sensor 193, such as ambient light, and provide input related thereto to the processor 122.

Additionally, though now shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that, an example client device or other machine/computer may include fewer or more features than shown on the system 100 of FIG. 1. In any case, it is to be understood at least based on the foregoing that the system 100 is configured to undertake present principles.

Figure 2:
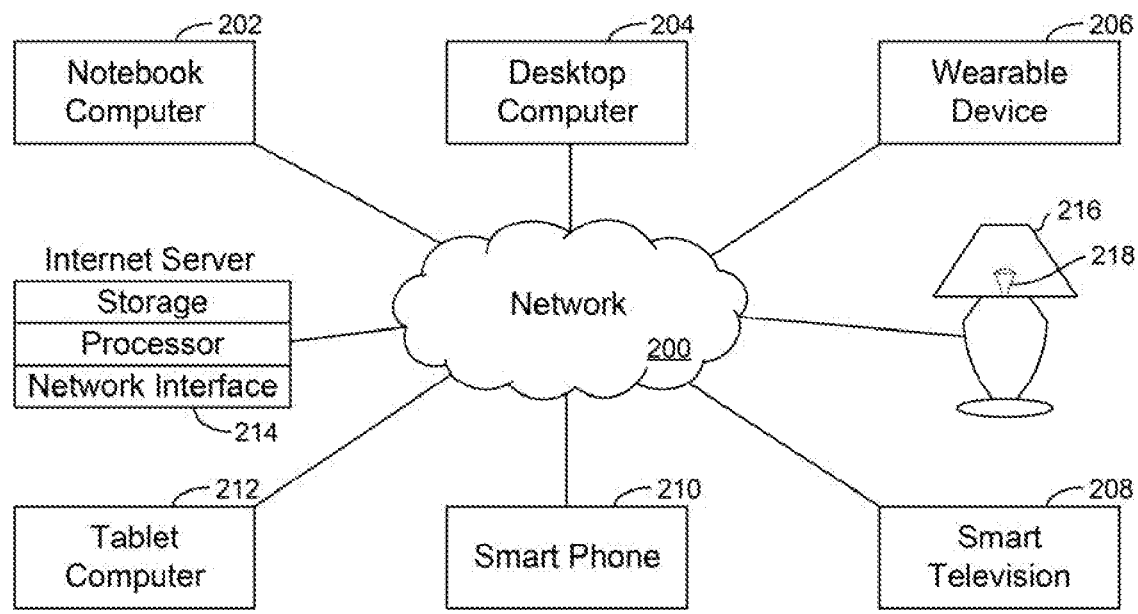
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, an Internet-enabled and computerized light output apparatus 216 such as a smart lamp, and a server 214 such as an Internet server that may provide cloud storage accessible to the devices 202-212, 216. The light output apparatus 216 may include a light bulb or other light emitter/source 218 such as a light emitting diode (LED) that under control, of a processor in the apparatus 216 may output light at varying brightness levels, hues, and saturation levels. It is to be understood that the devices 202-216 are configured to communicate with each other over the network 200 to undertake present principles.

Figure 3:
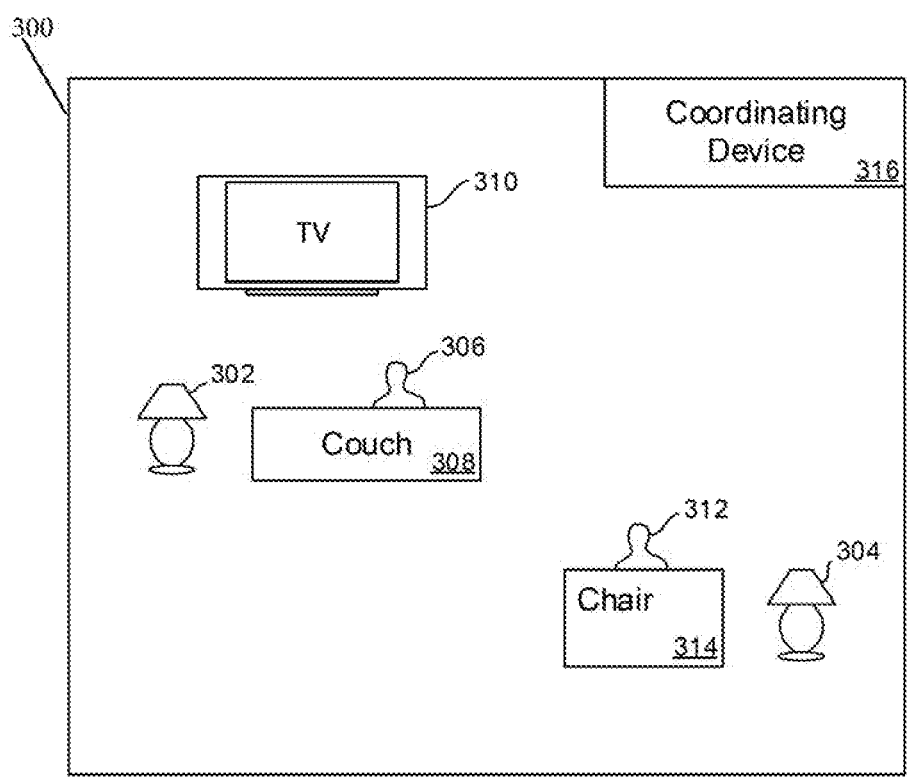
FIG. 3 is an example illustration of an environment or area to be lighted in accordance with present principles.

FIG. 3 is an illustration of an example environment or area 300 for which lighting output from light output apparatuses 302 and 304 may be tailored. In the example shown, the area 300 is a common area within a personal residence.

As maybe appreciated from FIG. 3, the area 300 includes a first user 306 sitting on a couch 308 adjacent to the apparatus 302 and observing audio video content presented on a television (TV) 310. At a different location within the area 300, a second user 312 is sitting in a chair 314 adjacent to apparatus 304 while reading.

In accordance with present principles, light output from the apparatus 302 may be adjusted based on one or more preferences of the first user 306, such as outputting yellow light of a particular brightness level, while observing audio video content on a TV. Light output from the apparatus 304 may be adjusted based on one or more preferences of the second user 308, such as outputting white light of a different brightness level while reading.

The light output of each of the apparatuses 302, 304 may be respectively controlled by each user's personal device (such as a smart phone they each have with them) based on transmission of commands from the personal devices to the apparatuses 302, 304. Light output of the apparatuses 302, 304 may also be controlled based on commands from a server in communication with the apparatuses 302, 304, the users' personal devices, and other devices within the area 300 such as an ambient light sensor device. Still further, light output of the apparatuses 302, 304 may be controlled based on commands from a coordinating device 316 disposed in or controlling devices within the area 300, where the device 316 is in communication with the apparatuses 302, 304, the users' personal devices, and other devices within the area 300. The device 316 may be a smart device having access to a network to which the apparatuses/devices 302, 304, and 316 are connected (such as a LAN) to control one or more of the devices 302, 304, 316. For example, in an internet of things environment, the device 316 may be a wall-mounted device for controlling devices within the Internet of things environment.

Figure 4:
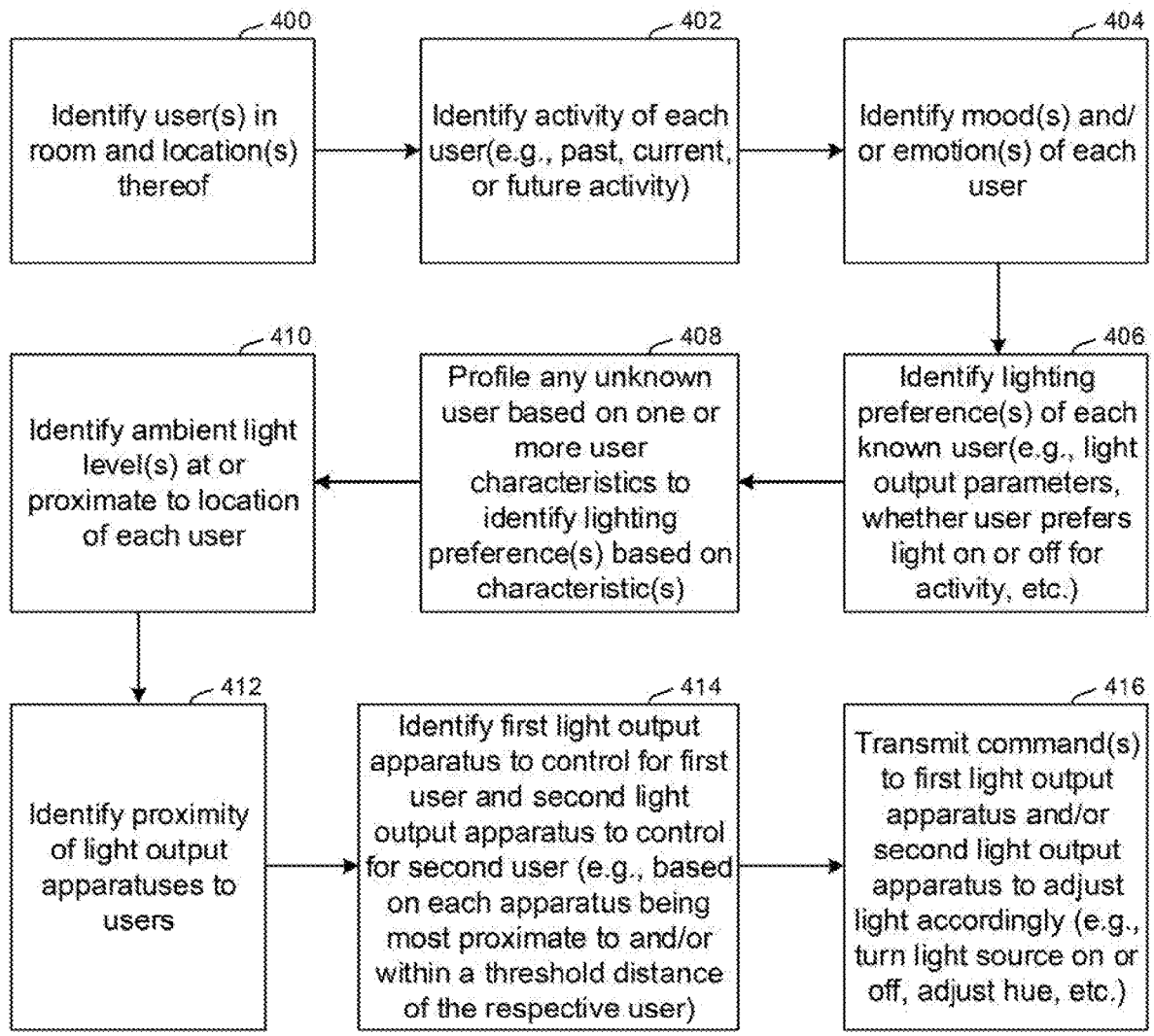
FIGS. 4 and 5 are flow charts of example algorithms in accordance with present principles.

Referring to FIG. 4, it shows example logic that may be executed by a device such as the system 100 (referred to when describing FIG. 4 as the "present device") to control light output of one or more light output apparatuses in accordance with present principles. The logic of FIG. 4 may be executed by any of the devices described herein, such as a coordinating device and/or server, any users personal device, a light output apparatus itself, etc.

Beginning at block 400, the logic identifies one or more users in an environment or common area such as a room of a personal residence. The logic may identify the users based on received images of the area taken by another device in communication with the present device and/or taken, using a camera or other optical imager on the present device itself. The logic may then execute facial and/or object recognition algorithms using the images to identify the users (and/or characteristics thereof, such as height, weight, gender, age, etc.).

The logic may also identify the users by identifying each user's personal device (such as a smart phone or tablet) as being present in the common area, and/or communicating over a network to which devices in the common area have access. Thus, in some examples the present device may assume users are adjacent to and/or at their respective devices, so that the users may be identified by identifying their respective personal devices.

For example, each user's personal device may be identified based on GPS coordinates from a GPS transceiver on each user's personal device that are received at the present device to then determine if each users' personal device is within the common area based on a comparison of GPS coordinates for the common area to the GPS coordinates from each users' personal device. Each users' personal device may also be identified by executing a received signal strength indication (RSSI) algorithm on received NFC or Bluetooth signals from the 'users' personal devices to thus identify a location of each personal device within the common area and/or relative to the present device, or at least a distance from the present device to each users' personal device, to then determine if each respective user is within the common area based on the location of each user's personal device relative to the present device.

Still, other ways of identifying the user at block 400 may be used, such as using voice recognition to identify the voice of a user from input from a microphone in the common area sensing the user's voice. Other types of biometric identification may be used as well, such as fingerprint identification or retina identification.

Also at block 400, the logic may identify a location of each user within the common area. The logic may do so by identifying the presence of a user at a particular location shown in an image from a camera or another optical imager, and/or by performing spatial analysis on the image to identify a location of the user relative to known locations of other objects in the image. Additionally or alternatively, input from a proximity sensor may be used to identify a location, such as input from an infrared (IR) proximity sensor. Echolocation may also be performed using a sound transceiver to identify the location of a user, and laser range finders may also be used.

Still further, the logic may identify the location of users by identifying the location of each users personal device and assuming that the user is at or adjacent to his or her personal device. Thus, GPS coordinates from the user's personal device may be used for determining location within the room, as may an RSSI algorithm based on signals from the users personal device. For example, RSSI may be used where signals from a Wi-Fi or Bluetooth transceiver on the user's personal device is received at various Wi-Fi or Bluetooth access points having known locations within the common area, and then used to determine a strength of signals from the user's personal device at the various Wi-Fi or Bluetooth access points to determine a distance of the personal device from each of the various access points and hence a location of the personal device relative to the various access points. Signal time of flight principles and algorithms, signal angle of arrival principles and algorithms, trilateration principles and algorithms (such as when the location of the access points are known), and/or triangulatio principles and algorithms may also foe used to identify a location of the user's personal device based on signals from that user's personal device.

From block 400, the logic of FIG. 4 may proceed to block 402. At block 402 the logic may identify at least one activity for each user. The activity may be a past activity, such as one occurring within a threshold time of a current time and/or within a threshold time at which step 402 is executed. The activity for each user may also be a current activity, such as activities being respectively performed simultaneously by each user. The activity may also be a future activity to be engaged in by a user.

The activity may be identified based on data in an electronic calendar for a respective user that is accessible to the present device and that indicates an activity. The activity may also be identified by executing object and/or gesture recognition on images from a camera gathering images of a user while within the common area to identify an activity based on objects being used and/or gestures being made. Still further, the activity may be determined based on communication with the user's personal device to identify an action being taken using the personal device, such as reading an electronic book, playing a video game, browsing the Internet, etc. The activity may also be determined based on a particular device or particular device type feeing used by the user, such as identifying that a video game console is in use and communicating over a network to which the present device is also connected to thus infer that a user is playing a video game. Even further, the activity may be determined based on a particular application (or merely a type of application) being executed at the user's personal device, such, as determining that a news application is being executed at the user's personal device to thus infer that the user is reading the news.

Even further, activities may be identified based on input from, a microphone to identify words being spoken by a user to then correlate at least some of those words to key words corresponding to particular activities. Activity histories and/or device use patterns that may be stored in a database accessible to the present device may also be used to identify an activity, such as inferring that a particular activity that has occurred five consecutive days in the past at a particular time of day will be engaged in again at an upcoming time of day matching the previous ones at which, the activity was engaged in, or inferring that a particular activity was recently engaged in by a user on a current weekday based on it being previously engaged in at similar times on past weekdays.

As another example, network traffic and/or bandwidth consumption may be used to infer an activity, for example, if a relatively high amount of bandwidth is being consumed by a user's personal device. It may be inferred that the user is watching a movie or video being streamed on their personal device.

Activities may also be inferred based on location alone. For instance, if a particular location in the common area is known by the present device to have fitness equipment thereat, it may be inferred by the present device that the user is exercising or was at a past time during which the user's personal device was located at that location.

After identifying one or more activities for each user in the common area, the logic of FIG. 4 may then move to block 404 where the logic may identify a mood, stress level, and/or emotion of each user. The logic may do so by executing stress level, emotion and/or mood analysis algorithms (e.g., a facial expression identification algorithm) on images of each user gathered by a camera, and/or by executing posture and gesture recognition analysis algorithms on those images. A user's stress level, mood, or emotion may also be identified based on words being spoken by the user, where the user's voice may be defected by a microphone so that words being spoken by the user may be identified and then correlated to key words associated with various stress levels, emotions, or moods.

From block 404 the logic may proceed to block 406. At block 406 the logic may identify one or more lighting preferences for each user that was identified at block 400 and for which lighting preferences are accessible (sometimes referred to as "known" users). The one or more lighting preferences tor each user may be stored in a data table and/or database accessible to the present device so that the present device may identify lighting preferences in the data table/database based on an identified user. An example data table of lighting preferences will be described below in reference to FIG. 6.

Examples of lighting preferences include whether a user likes lighting on or off, such as during a particular activity or time of day, as well as how bright, intense, or luminous a user prefers ambient light to be (or light from a particular light output apparatus). Lighting preferences may also include light temperature, hue or color, and/or saturation, such as may be altered in embodiments where an LED is controlled by the present device.

After block 406, the logic of FIG. 4 may move to block 408. At block 408 the logic may profile and/or stereotype users for which lighting preferences are not accessible, such as new users or users in the common area for the first time (sometimes referred to as "unknown" users). For example, an unknown user may have been identified at block 400, and responsive to identifying the user as unknown at block 400, the logic may have also identified one or more characteristics of the user by executing object, facial, and/or user recognition using one or more images of the user. Examples of characteristics include height weight, age, gender, an identified relationship to another person in the common area, etc. Once one or more characteristics are identified, a data table or database may be accessed that indicates lighting preferences based on various characteristics. If more than one characteristic is identified for an unknown user, the characteristics may even be weighted so that one of otherwise conflicting lighting preferences identified based on different characteristics of a given unknown user may be selected. In some instances, the database may even include an aggregation of lighting preferences of various users sharing a particular characteristic so that a mode and/or most-occurring lighting preference for that particular characteristic among those users may be selected as a default to be used for unknown users having the same characteristic.

As an example of identifying a lighting preference of an unknown user by profiling, an unknown female may be identified as being in the common area. A database of lighting preferences may then be accessed to identity data therein indicating that women are by default assumed to prefer a yellow lighting hue, and/or to identify that a yellow lighting hue is a most commonly-occurring hue lighting preference for women in the database.

From block 408, the logic of FIG. 4 may then continue to block 410. At block 410 the logic may identify one or more ambient light levels of the common area based on input from one or more ambient light sensors, such as identifying ambient light levels at or proximate to (such as within a threshold distance of) an identified location of each user based on input from ambient light sensors at or proximate to the identified locations. In some embodiments, this may be useful for the present device to comport with one or more lighting preferences of a user if one of the user's lighting preferences is a particular ambient light level preference, or a total, brightness preference, so that light from a light output device may be output to add to an identified, already-existing ambient light level to match a users preference.

From block 410 the logic may then move to block 412. At block 412 the logic may identify the location of light output apparatuses in the common area and the proximity of light output apparatuses to users at identified locations within the common area. For example, locations and proximity may be determined by accessing data indicating known locations for the lighting output apparatuses and comparing that data to the identified locations of the users. The locations may also be determined based on object recognition and spatial analysis using images of the common area, based on GPS coordinates for the light output, apparatuses communicated by the light output apparatuses, by employing an RSSI location identification using signals transmitted from the light output apparatuses, using another method for determining a location of a device as disclosed herein, etc.

Once location and proximity to users are determined at block 412, at block 414 the logic may identify one or more light output apparatuses to control for a given user. For example, in some embodiments a light, output apparatus to be controlled to comply with a given user's preference(s) may be identified as a most-proximate light output apparatus to that user so that if multiple users are in the common, area and have differing lighting preferences, a most-proximate light output apparatus to each user may be selected and controlled at block 416 (as will be described shortly) to comply with the lighting preferences of that particular user. In other examples, a light output apparatus to be selected and controlled for a first user's preference(s) may be identified on the basis of being a more-proximate light output apparatus to the first user than to another user, even if not the most-proximate light-output apparatus to the first user. In still other examples, a light output apparatus may be selected and controlled for complying with a first user's preferences) based on identification of it being at the location of the first user. Further still, in some examples two or more light output apparatuses at different locations within the common area may be selected for control to meet a particular user's lighting preferences.

The light output apparatuses that are identified at block 414 may also be identified based on their ability to output light that complies with, a user's preference(s) based on things such as their location relative to the user and capability to output certain hues of light. Also in addition to or in lieu of the foregoing, plural light output apparatuses (and in some examples, all light output apparatuses that are controllable) may be identified and collectively used to meet one or more users' preferences, such as identifying two smart lamps that may be controlled to increase an ambient light level in the common area and to provide yellow light.

Then, at block 416, the logic may transmit one or more commands to each light output apparatus identified at block 414 for the respective light output apparatus to output or adjust light output accordingly, such as by turning a light source (e.g., an LED) for the light output apparatus on or off and/or adjusting a hue of light from the light output apparatus. The logic may transmit the one or more commands over a Wi-Fi network or Internet of things network to which the present device and the light output apparatuses are connected, as well as using Bluetooth communication, near field communication (NFC) communication, wired communication, radio frequency (RF) communication, etc.

Figures 5, 6:
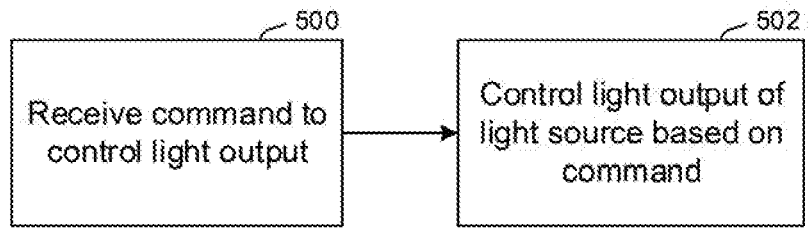
FIG. 6 is an example data table in accordance with present principles.

FIG. 5 shows example logic that may be executed by a light output apparatus in accordance with present principles. The logic of FIG. 5 begins at block 500, where the logic may receive a command to control light output at the light output apparatus. For example, the command may have been received by a device executing the logic of FIG. 4 discussed above. Then at block 502 the logic may control light output, from a light source on the light output apparatus based on the command, such as by increasing a brightness level, changing a hue of light from the light source, etc. In one example, the light source may be a light emitting diode (LED) controllable to output light at various brightness levels, hues, etc, using an LED control algorithm.

FIG. 6 shows a data table 600 that may be used in accordance with present principles to identify one or more lighting preferences based on various factors. The data table 600 includes a first column 602 listing various users, a second column 604 listing various activities, and a third column 606 listing various moods or emotions, a fourth column 608 listing various times of day, a fifth column 610 listing a light, output parameter and/or user preference (associated with one or more of the user, activity, mood/emotion, or time of day for that row) for whether a light/output apparatus is to be on or off, a sixth column 612 listing a light output parameter and/or user preference (again associated with one or more of the user, activity, mood/emotion, or time of day for that row) of a particular brightness level of light, and a seventh column 614 listing a light output parameter and/or user preference (again associated with one or more of the user, activity, mood/emotion, or time of day for that row) of a particular hue of light. Note that default unknown user data is also show in the table 600 for a male user and a female user.

Providing an example of how the table 600 may be used, a device undertaking present principles may identify "User 1" as described herein and a mood of User 1 as being content as also described herein. The device can then access the data table 600 and parse data in column 602 until at least one entry matching User 1 is located in column 602, and then parse data in column 606 until at least one entry for User 1 is located in column 606 that also matches the mood of User 1 as being content. The logic may then access an entry in one or more of columns 610, 612, and 614 in the row for the matched entries in both column 602 and 606 (in this case, the top row) to identify one or more light output parameters and/or user preferences to use for controlling a light output apparatus in accordance with present principles. In this example, the light output parameters to apply are that a light output apparatus is to be on, outputting light at a brightness level of five (on a scale from one to five), and outputting light in a yellow hue. These parameters may be based on preferences as specified by User 1, as determined by a device dynamically learning the preferences of User 1 as User 1 made manual adjustments to the lighting environment, as determined based on an assumed default preference for User 1 identified based, on a profiling of User 1, etc.

As another example of how the table 600 may be used, a device undertaking present principles may identify an activity as described herein, even if for example, it will not use user ID, mood of the user, or time of day for identification of a lighting preference to apply. The device can then access the data table 600 and parse data in column 604 until an entry matching the activity is located in column 604. The logic may then access an entry in one or more of columns 610, 612, and 614 for the row corresponding to the matching entry in column 604 to identify one or more light output parameters and/or user preferences to use for controlling a light output apparatus in accordance with present principles.

Figure 7:
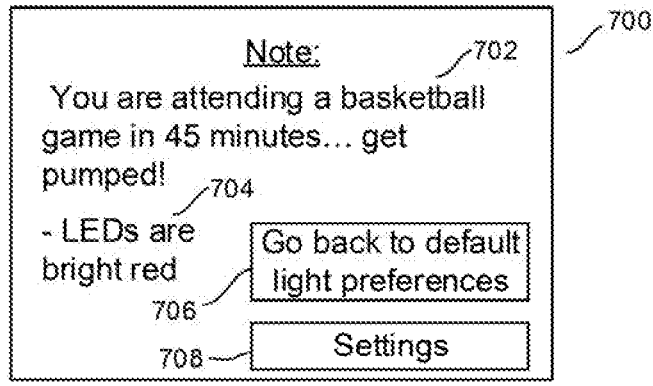
FIGS. 7 and 8 are example user interfaces (UIs) in accordance with present principles.

FIG. 7 shows an example user Interface (UI) 700 that may be presented on a device in accordance with present principles, such as a user's personal smart phone device and/or a coordinating device mounted on a wall in an Internet of things environment. The UI 700 includes an indication 702 of an activity identified as to be engaged in by a user within a threshold time, which in this case is attendance at a basketball game as identified based on an entry in an electronic calendar. The UI 700 also includes an indication 704 of how one or more light output apparatuses are being controlled based on the activity, which in this case is an indication that LEDs are emitting bright red light to correspond to an identified team color for the home team of the basketball game.

The UI 700 also includes a selector 706 that is selectable (such as based on touch input) to command the light output apparatuses to output light in accordance with a default light preferences) for the user instead of based on the basketball game activity. This may be the case where, for example, the user has previously provided input indicating default lighting preferences, such as outputting white light of a particular brightness level by default. The UI 700 also includes a selector 708 that is selectable to cause a settings UI to be presented for configuring one or more settings in accordance with present principles, such as configuring one or more default light preferences or factors for which light output should be adjusted.

Figure 8:
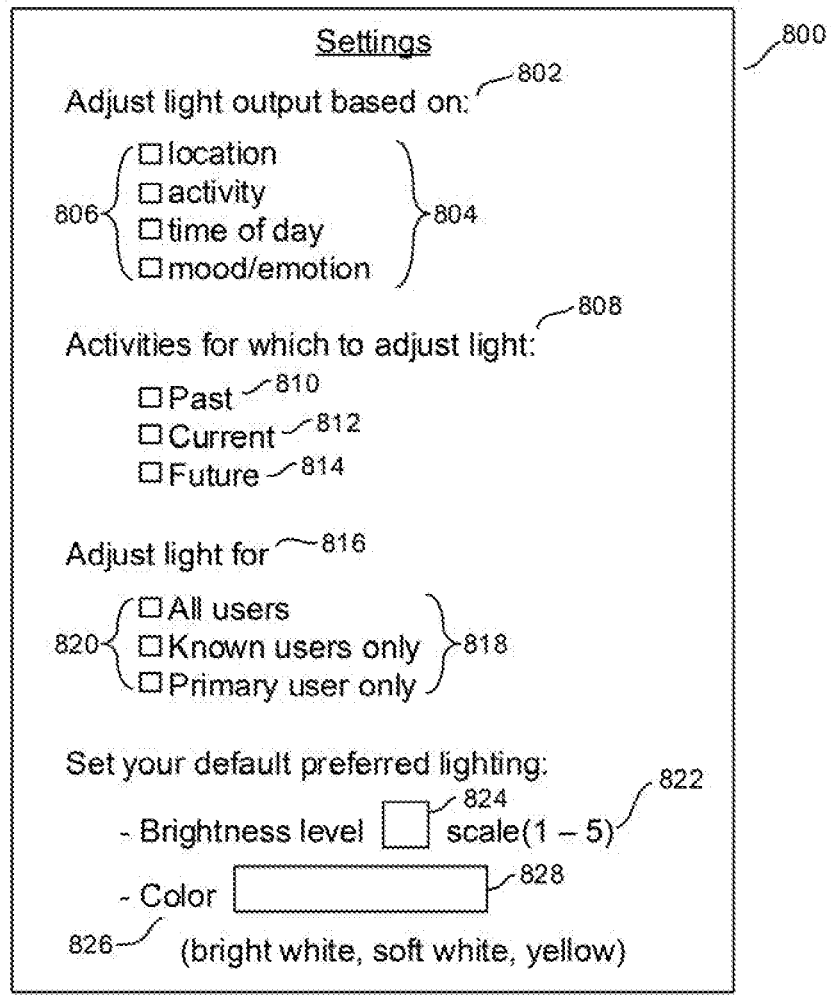

The UI 800 of FIG. 8 is one example of such a settings UI. The UI 800 includes a first setting 802 for configuring a system to adjust light output, based on one or more options or factors 804 respectively selectable using cheek boxes 806. In the example shown, the options/factors include location, activity, time of day, and mood/emotion. The UI 800 also includes a second setting 808 for configuring the system to adjust light output based on past activities (option 810, selectable using the check box shown), based on currently-occurring activities (option 812, selectable using the check box shown), and based on future activities (option 814, selectable using the check box shown).

Even further, the UI 800 may include another setting 816 for configuring a system to adjust light output based on one or more user types 818 respectively selectable using check boxes 820. In the example shown, this includes configuring the system to adjust light output based on all users, known users, and only a primary or default user (but not other identified users).

The UI 800 of FIG. 8 also includes an option 822 to provide input using input box 824 of a default, brightness level for output of light for a particular user in accordance with present principles. The UI 800 further includes an option 826 to provide input using input box 828 of a default color of light to be output for the particular user in accordance with present principles. Though such options are not shown in FIG. 8, it is to be understood that defaults may also be configured not just based on a particular user, but based on a particular activity, a particular time of day, a particular mood, etc.

It is to be understood that in addition to controlling one light output apparatus to meet a first user's preferences and controlling another light output apparatus to meet a second user's preferences, an average, balance, or compromise between user preferences of the same type, but for different users, may be used to uniformly control more than, one light output apparatus or to control the apparatuses independently but while still factoring in the effect of light from both apparatuses to meet the average, balance, or compromise. For instance, if one user prefers white light at a brightness level of five and the other prefers yellow light at a brightness level of three, a device undertaking present principles may control plural smart lamps to output yellow-white light with a brightness level of four.

It is to also be understood that lighting conditions to be controlled in accordance with present principles may be identified based on historical usage patterns and/or light adjustments made by a user for factors such as time of day, day of the week, day of the month, day of the year, weather conditions (such as whether the weather is cloudy or sunny), type of activity, and de facto priority levels for preferences of certain users to apply from among plural users present in a given instance (such as if there is a conflict of preferences). An identified amount and/or quality of sleep a user has received the night before may also be used, such as may be identified based on input from a sleep monitoring device to identify whether the user is lethargic and hence may want relatively less brightness output (or relatively more, depending on user preference) than if wide awake, mobile, and/or exercising.

Lighting conditions may also be controlled based on a speed indicated by a user at which the user desires lighting changes to take effect. For instance, one user may configure a system undertaking present principles to perform an immediate change in lighting conditions once the system identifies that a change is to occur, while another user may configure the system to perform a gradual change (over a predetermined time period, such as ten seconds) once the system identifies that a change is to occur. Where the lighting change is gradual, a user may even provide audible input when desired lighting conditions are reached, which, responsive to the audible input being received by the system, may cause the system to automatically stop changing the lighting any further and to leave the lighting in the state in which it was configured when the input was received. These types of user preferences may be learned over time by the system to make future adjustments in conformance with those learned preferences.

Providing some examples in accordance with present principles, if a first user prefers light intensity of X and a second user prefers light intensity of Y, a system undertaking present, principles may set a Light intensity for a room in which both users are disposed at an intensity midway between X and Y.

As another example, if a first user is on an opposite side of a room from a second user, each user's preferred lighting conditions may be delivered to them based on activities in which they are currently engaged at the same time via respective smart lamps at or proximate to the location of each user.

As another example, if a single user is reading something in a particular location within a room, lighting for that location may be adjusted to the user's lighting preferences for the activity of reading.

As another example, suppose that after a long day of work (as identified based on a total time at a work location for a given day) or an exhilarating sporting event (as identified based on location data for the user, metadata associated with the sporting event, and/or an entry in the user's electronic calendar), a user is identified as having a tired mood and that, when tired, the user prefers a relatively low light brightness level of two. A system executing the logic in accordance with present principles may identify this mood, and that the user is likely about to cook a meal upon returning home, and accordingly the system may automatically set lights in the kitchen of the user's home to a brightness level of two before the user actually enters the kitchen.

As still another example, a user may prefer relatively high brightness output while at home in the morning, but relatively low brightness output upon arriving home again in the evening. A system undertaking present principles may accordingly adjust light output based on the time of day.

As yet another example, based on a historical pattern of a user walking a dog at night and returning home with the dog at 10:00 p.m., and based on a default lighting preference for the user being that he or she likes yellow light, a system undertaking present principles may turn on a porch light at 9:59 p.m. (or another threshold time before the event) and control it to emit yellow light.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application, is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein.

What is claimed is:

1. A device, comprising:
   at least one processor;
   a communication interface accessible to the at least one processor; and
   storage accessible to the at least one processor and bearing instructions executable by the at least one processor to:
   identify a first user at a first location within a common area and identify a second user at a second location within the common area;
   based on at least one lighting preference of the first user and based on a determination that a first light output apparatus is at least within a threshold distance of the first location, adjust light output from the first light output apparatus; and
   based on at least one lighting preference of the second user and based on a determination that a second light output apparatus is at least within a threshold distance of the second location, adjust light output from the second light output apparatus;
   wherein the instructions are also executable to identify an activity associated with the first user and to adjust light output from the first light output apparatus based on the activity, wherein the activity is an activity previously engaged in by the first user within a threshold time of a current time.

2. The device of claim 1, wherein the instructions are executable by the at least one processor to:
   profile the first user based on at least one identified characteristic of the first user; and
   adjust light output from the first light output apparatus based on the profiling of the first user.

3. The device of claim 1, wherein the instructions are executable by the at least one processor to:
   identify a light output parameter associated with the first user, wherein the light output parameter associated with the first user comprises one or more of: a particular brightness level, a particular hue, a particular saturation level; and
   adjust light output from the first light output apparatus based on the light output parameter.

4. The device of claim 1, wherein the instructions are executable by the at least one processor to identify a news application as being executed at the device and to adjust light output from the first light output apparatus based on the identification of the news application as being executed at the device.

5. The device of claim 1, wherein the activity is identified at least in part by correlating received speech from the first user to the activity.

6. The device of claim 1, wherein light output from the first and second light output apparatuses is adjusted by using the communication interface to transmit commands to the first and second light output apparatuses to adjust light output.

7. The device of claim 1, wherein the instructions are executable by the at least one processor to:
based at least in part on a priority level of the first user being higher than a priority level of the second user, use the at least one lighting preference of the first user to control light output from both of the first light output apparatus and the second light output apparatus.

8. The device of claim 1, wherein the instructions are executable to:
present a user interface (UI) on a display, the UI comprising an option that is selectable by a user to set a system to adjust light output from at least the first light output apparatus based on one or more user activities.

9. The device of claim 1, wherein the instructions are executable to:
identify an amount of sleep received by the first user; and
based at least in part on the amount of sleep, adjust light output from one or more of the first light output apparatus and the second light output apparatus.

10. A method, comprising:
identifying a first user at a first location within an area and identifying a second user at a second location within the area;
based on determining that a first light output apparatus is at least within a threshold distance of the first location, adjusting light output from the first light output apparatus using a first lighting preference of the first user; and
based on determining that a second light output apparatus is at least within a threshold distance of the second location, adjusting light output from the second light output apparatus using a second lighting preference of the second user;
wherein the method further comprises identifying an activity associated with the first user and adjusting light output from the first light output apparatus based on the activity, wherein the activity is an activity previously engaged in by the first user within a threshold time of a current time.

11. The method of claim 10, comprising:
identifying an amount of sleep received by the first user; and
based at least in part on the amount of sleep, controlling light output from one or more of the first light output apparatus and the second light output apparatus.

12. The method of claim 10, wherein the method comprises:
based at least in part on a priority level of the first user being higher than a priority level of the second user, using a first lighting preference of the first user to control light output from at least the first light output apparatus.

13. The method of claim 12, comprising:
based on the first lighting preference of the first user and based on a second lighting preference of the second user, averaging light output from at least the first light output apparatus.

14. The method of claim 10, comprising:
presenting a user interface (UI) on a display, the UI comprising an option that is selectable by a user to set a system to adjust light output from at least the first light output apparatus based on one or more user activities.

15. The method of claim 10, wherein the method comprises identifying a news application as being executed at a device and adjusting light output from the first light output apparatus based on identifying the news application as being executed at the device.

16. A computer readable storage medium (CRSM) that is not a transitory signal, the CRSM comprising instructions executable by at least one processor to:
identify a first user at a first location within an area and identify a second user at a second location within the area;
based on at least one lighting preference of the first user and based on a determination that a first light output apparatus is at least within a threshold distance of the first location, control light output from the first light output apparatus; and
based on at least one lighting preference of the second user and based on a determination that a second light output apparatus is at least within a threshold distance of the second location, control light output from the second light output apparatus;
wherein the instructions are also executable to identify an activity associated with the first user and to control light output from the first light output apparatus based on the activity, wherein the activity is an activity previously engaged in by the first user within a threshold time of a current time.

17. The CRSM of claim 16, wherein light output from the first and second light output apparatuses is controlled by using a communication interface to transmit commands to the first and second light output apparatuses to control light output.

18. The CRSM of claim 16, wherein the instructions are executable to:
based at least in part on a priority level of the first user being higher than a priority level of the second user, use the at least one lighting preference of the first user to control light output from both of the first light output apparatus and the second light output apparatus.

19. The CRSM of claim 16, wherein the instructions are executable to:
identify an amount of sleep received by the first user; and
based at least in part on the amount of sleep, control light output from one or more of the first light output apparatus and the second light output apparatus.

20. The CRSM of claim 16, wherein the instructions are executable by the at least one processor to identify a news application as being executed at a device and to adjust light output from the first light output apparatus based on the identification of the news application as being executed at the device.

* * * * *